Patented Feb. 9, 1937

2,070,177

UNITED STATES PATENT OFFICE 2,070,177

DISPERSING AGENT

Oscar A. Pickett, Kenvil, N. J., assignor to Hercules Powder Company, Wilmington, Del., a corporation of Delaware No Drawing. Application September 14, 1929, Serial No. 392,741

2 Claims. (Cl. 134—26)

My invention relates to dispersing agents for pigments, fillers, and the like.

As is well known in the production of paints, lacquers, etc. and in the compounding of rubber, dispersions of pigments, fillers, and the like, are used, the pigment, filler, or the like, being finely dispersed in a liquid or plastic medium, that is to say, desirably, agglomeration and/or flocculation of the pigment, filler, or the like, in the liquid or plastic medium is avoided as far as possible. Heretofore in the production of dispersions it has been generally customary to subject the pigment, filler, or the like, to long grinding in the liquid or plastic material in which it is to be dispersed and in certain cases it has been attempted to effect the desired fine degree of dispersion through the use of some agent which will operate to wet the surfaces of the particles to be dispersed, with a view to negativing their tendency to agglomerate. Heretofore it has not been practical to obtain a desirable maximum degree of dispersion of pigments, fillers, and the like.

Now, it is the object of my invention to provide a number of substances through the use of which dispersions of pigments, fillers, and the like, may be obtained to a maximum degree without the necessity for any special manipulation, such as long grinding.

In accordance with my invention I have found that certain terpene derivatives have a peculiar surface activity for pigments, fillers, and the like, or, in other words, that certain terpene derivatives have to a peculiarly high degree the capacity for wetting the surfaces of particles of pigments, fillers, and the like when dispersed in a liquid or plastic medium, with the result that agglomeration and/or flocculation of such particles is in all cases definitely minimized or avoided.

In accordance with my invention, I have found that terpene derivatives, such as substantially pure abietic acid, terpene alcohols, as alpha terpineol, borneol, fenchyl alcohol, and the like, terpene hydrocarbons, such as dipentene, limonene, or the like, as such or polymerized, terpene ethers, such as anethol, and the like, terpene esters, such as ethyl abietate, methyl abietate, or the like, and terpene ketones, such as camphor, fenchone, and the like, have a peculiar surface activity and will, to a remarkable degree, effect surface wetting of particles of pigments, fillers, and the like, dispersed in a liquid or plastic medium, with the ready production of desired dispersions. Where it is desired to use a polymerized terpene hydrocarbon, such may be produced, for example, by subjecting, for example, dipentene to heat in the presence of a catalyst, as fuller's earth, activated carbon or metallic chloride, for example, as disclosed in United States Patents No. 1,691,067, November 13, 1928, and No. 1,691,068, November 13, 1928, or by similar treatment of, for example, alpha terpineol to effect conversion of hydrocarbons and then effecting polymerization of the hydrocarbons.

In the practical adaptation of my invention for the preparation of a desired dispersion, it is only necessary to work together a desired pigment or filler, a desired liquid or plastic medium and one or another of the terpene derivatives above mentioned. On the working together of the ingredients the terpene derivative will preferentially wet the surfaces of the particles of the pigment, filler, or the like, with the result that the tendency of the particles to agglomerate and/or flocculate will be greatly minimized or avoided so that the particles will be largely individually dispersed throughout the liquid or plastic medium.

In the practical adaptation of my invention various pigments, fillers, and the like, may be used depending upon the purpose for which the dispersion is desired, and similarly various liquid and plastic mediums may be used. As has been indicated, my invention is adaptable for application to the production of paints, lacquers, rubber compounds, etc., and, for example, for paints there may be used pigments such as lead oxide, or white lead, zinc oxide, iron oxide, etc.; for lacquers there may be used pigments similar to those used for paints and in rubber compounds there may be used various pigments or fillers such as those generally known as reenforcing fillers, as carbon black, zinc oxide, magnesium carbonate, certain clays, and the like, or those generally known as diluents, such as whiting, lithopone, barytes, and the like. In the practical adaptation of my invention various liquid or plastic mediums may be used depending upon the use for which the dispersion is intended. Thus, for example, there may be used as the liquid medium kerosene oil, linseed oil, lacquer solvents, as butyl acetate, ethyl acetate, or the like, and as plastic mediums, celluloid, rubber, etc. It may be understood that in accordance with my invention I contemplate the use of any pigment, filler, or the like, together with any liquid or plastic medium which may be desired for the production of a dispersion for any general or specific use.

As illustrative of the practical adaptation of my invention to the production, for example, of a paint, for example, lead oxide, or white lead, and linseed oil in desired proportions, are introduced into a grinder as, for example, a pebble mill, and there is added one or another of the terpene derivatives above mentioned, as for example, substantially pure abietic acid, in quantity proportioned to the quantity of lead oxide such that the surfaces of particles of lead oxide will be effectively wetted by the abietic acid. It will be understood that while it is essential that sufficient abietic acid be added to effectively wet the surfaces of the particles of the lead oxide, it is immaterial if some excess of abietic acid is added. Hence, in proceeding in a practical manner any convenient quantity of abietic acid may be added initially and a further quantity added after grinding has progressed, if the initial quantity is observed to be insufficient.

It will be understood that the theoretical amount of abietic acid to be added to effectively wet the surfaces of the particles depends upon the degree of fineness to which the lead oxide is ultimately ground and the degree of dispersion desired and hence would vary in different cases, but may be readily determined for all practical purposes by observation. After the addition of the lead oxide, linseed oil and, for example, abietic acid, to the grinder, the lead oxide is ground to the desired particle size and if necessary an additional quantity of abietic acid added. The desired product will be produced in substantially less time than heretofore, since the dispersion of the particles of white lead will be more rapidly and efficiently effected than heretofore due to the preferential wetting of the surfaces of the particles by the abietic acid. The product, when it has reached the desired consistency, is removed from the grinder and may be diluted with linseed oil, or other diluent, and drier, coloring matter, etc., added for the production of ready mixed paint, or the product may be packaged and shipped for the production of paint on the job.

As illustrative of the practical adaptation of my invention, for example, to the production of a lacquer, for example, a suitable pigment, such as zinc oxide, is ground with a nitrocellulose base, as for example, nitrocellulose dissolved in butyl acetate, together with one or another of the terpene derivatives above mentioned, as for example, fenchyl alcohol. The amount of fenchyl alcohol will be determined by the ultimate particle size of the pigment and by the degree of dispersion desired, it being understood that some excess of fenchyl alcohol will be non-injurious. Thus, an initial quantity of fenchyl alcohol may be added to the grinder, as in the case of the production of a paint, and a further quantity added if the necessity therefor appears from abservation, it being only necessary that sufficient fenchyl alcohol be used to effect preferential wetting of the surfaces of the particles of the pigment.

As illustrative of the practical adaptation of my invention in connection with the production of rubber compounds, for example, a mix including rubber, a filler, which may be either a reenforcing filler or a diluent filler, ground to a desirable particle size, sulphur, one or another of the terpene derivatives above mentioned and such other ingredients as may be desirable is formed and incorporated by manipulation of the mix with rolls such as are customarily used in the rubber industry. In the incorporation of the ingredients the terpene derivative will preferentially wet the surfaces of the particles of the filler and as a result will prevent agglomeration and/or flocculation of the filler and permit the particles to become readily dispersed throughout the rubber. After incorporation the rubber is vulcanized or cured in the usual manner.

In the production of a rubber compound the amount of terpene derivative required will obviously vary with the particle size to which the filler is ground. However, it is only necessary to use a sufficient quantity of the terpene derivative to wet the surfaces of the particles, it being understood that some excess of terpene derivative will be non-injurious. Thus, the quantity of terpene derivative required in the case of the several terpene derivatives above mentioned may be readily determined by observation.

In connection with the production of rubber compounds, it will be noted that the terpene derivatives above mentioned will have a tendency at or about curing or vulcanizing temperature to combine with sulphur to form unstable compounds which at or about curing or vulcanizing temperatures will break down and release free sulphur, which will more readily combine with the rubber than will the sulphur in its original condition as introduced into the compound. Further, in connection with the production of rubber compounds where diluent fillers are used, in many cases, as for example, in the case of barytes, the use of one or another of the terpene derivatives above mentioned and by which, as has been indicated, the surfaces of the particles of the filler will be preferentially wetted, the diluent filler, as barytes, will be rendered to a degree reenforcing rather than effective merely as a diluent as heretofore.

In connection with the practical adaptation of my invention to the production of dispersions, it will be understood that one or another of the terpene derivatives above mentioned may be utilized to effect wetting of the surfaces of particles of pigments, fillers, etc., where such are usually ground dry or in some liquid medium from which they are separated after grinding and which is not intended as an ingredient of such product for use in which the pigment, filler, etc., is prepared. In such case the terpene derivative is added to the pigment in the grinding operation and will effectively preferentially wet the surfaces of the ultimate particles into which the material is ground with the result that the material when separated from the liquid medium in which it is ground will be non-agglomerated and/or non-flocculated and may be readily dispersed in any desired liquid or plastic medium for ultimate use, due to the fact that the surfaces of the particles of the substance will be wetted as described.

It will be understood that the several terpene derivatives mentioned above will be used in connection with the production of dispersions, as paints, lacquers, and rubber compositions, etc., in a manner similar to that described above for purposes of illustration in connection with the use of substantially pure abietic acid and fenchyl alcohol.

It will be understood that I do not intend that my invention shall be limited to the particular use described herein by way of illustration, its use in connection with the production of dispersions of substances generally in mediums generally being contemplated by me.

What I claim and desire to protect by Letters Patent is:

1. A new composition including in mechanical admixture a pigment, filler or the like, a terpene alcohol and a fluid vehicle, the pigment, filler or the like being dispersed in the form of fine particles in the vehicle and the terpene alcohol acting as a dispersing agent for the pigment, filler or the like.

2. A new composition including in mechanical admixture a pigment, filler or the like, fenchyl alcohol and a fluid vehicle, the pigment, filler or the like being dispersed in the form of fine particles in the vehicle and the fenchyl alcohol acting as a dispersing agent for the pigment, filler or the like.

OSCAR A. PICKETT.